United States Patent
Brown

Patent Number: 5,806,331
Date of Patent: Sep. 15, 1998

[54] WATER-BASED HOT WATER HEAT PUMP

[75] Inventor: Robert R. Brown, Markle, Ind.

[73] Assignee: Waterfurnace International, Inc., Fort Wayne, Ind.

[21] Appl. No.: 914,705

[22] Filed: Aug. 19, 1997

Related U.S. Application Data

[63] Continuation of Ser. No. 511,683, Aug. 7, 1995, abandoned.

[51] Int. Cl.$^6$ .................................................... F25B 27/00
[52] U.S. Cl. ............................. 62/238.6; 62/260; 165/45
[58] Field of Search ............................... 62/238.1, 238.6, 62/238.7, 260; 165/45

[56] References Cited

U.S. PATENT DOCUMENTS

| | | | |
|---|---|---|---|
| 4,375,831 | 3/1983 | Downing, Jr. | 62/238.7 |
| 4,448,037 | 5/1984 | Hama et al. | 62/188 |
| 4,575,001 | 3/1986 | Oskarsson | 237/2 B |
| 4,718,248 | 1/1988 | Fisher | 62/238.7 |
| 4,856,578 | 8/1989 | McCahill | 165/29 |
| 4,924,681 | 5/1990 | DeVit | 62/238.6 |
| 4,993,483 | 2/1991 | Harris | 62/260 |
| 5,038,580 | 8/1991 | Hart | 62/324.6 |
| 5,269,153 | 12/1993 | Cawley | 62/180 |
| 5,305,614 | 4/1994 | Gilles | 62/238.7 |

*Primary Examiner*—John M. Sollecito
*Attorney, Agent, or Firm*—Baker & Daniels

[57] ABSTRACT

A hot water heat pump is coupled to a primary liquid heat source, typically an earth coupled closed loop system, and a hot water retention tank. The hot water heat pump extracts heat from the liquid heat source and gives off heat to water stored in the hot water retention tank. A coupling device is connected to the liquid heat source conduit for diverting liquid heat source flow to the hot water heat pump. A dedicated liquid heat source pump maintains liquid heat source flow through a first heat exchanger in the domestic hot water heat pump independent of primary heat, source operation. Refrigerant flows through both the first heat exchanger and a second heat exchanger. Water stored in the retention tank is circulated by the dedicated hot water circulating pump through the second heat exchanger thereby removing heat from the refrigerant. The stored water is typically used for domestic hot water supply.

32 Claims, 1 Drawing Sheet

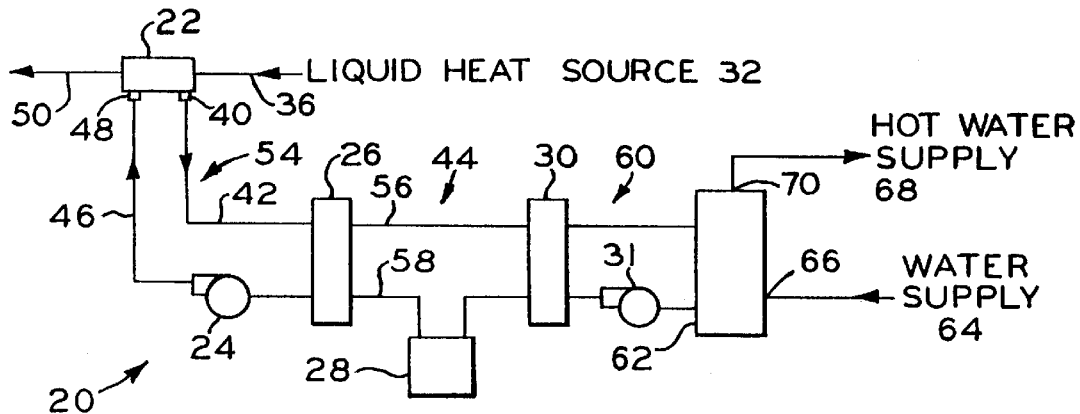
FIG_1
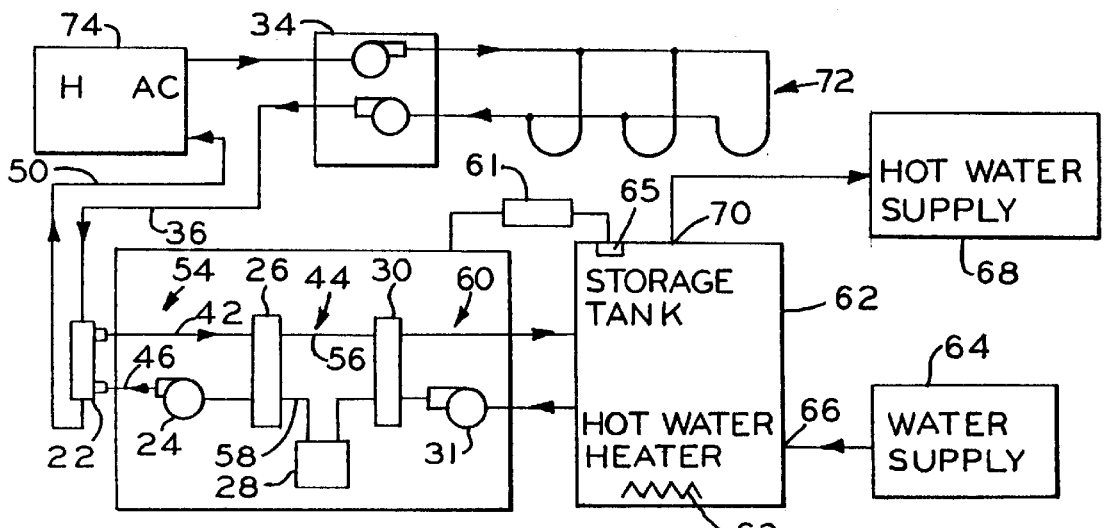
FIG_2
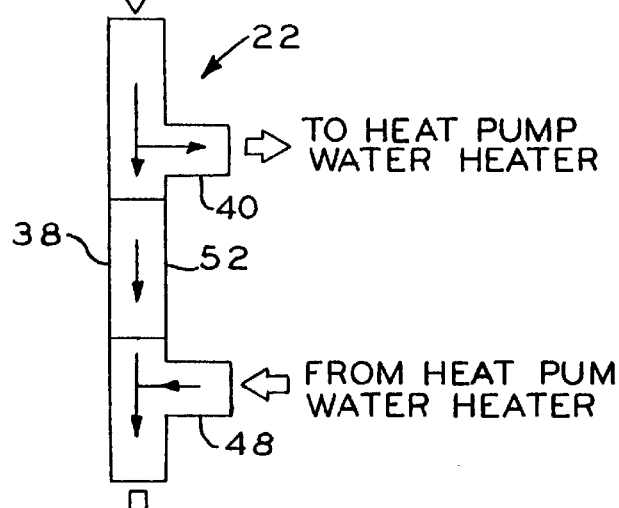
FIG_3

WATER-BASED HOT WATER HEAT PUMP

This is a continuation of application Ser. No. 08/511,683, filed Aug. 7, 1995, now abandoned.

BACKGROUND OF THE INVENTION

The invention generally relates to liquid heating apparatus used to raise the temperature of a connected body of water, such as utilized to provide domestic hot water supply. More particularly, the invention relates to hydronic systems, especially earth coupled closed loop systems, to which a heat pump is coupled in heat exchange relationship for providing domestic hot water supply. It is known to replace or augment conventional electric resistance hot water heaters with heat pumps as a more efficient means of producing domestic hot water. It is known to provide combined space conditioning and water heating apparatus or self contained heat pump water heaters for providing domestic hot water. Generally, primary circulating pumps are incorporated in earth coupled ground loop systems for circulating a primary liquid heat source. In combined systems these primary pumps may be required to run for water heating purposes even if not needed by the primary space conditioning system. This results in wasted energy in operating the primary pumps merely for water heating purposes.

Earth coupled closed loop heat pump systems involve thermal exchange between the earth and a primary space conditioning heat pump system for operation in either space heating or cooling modes. One type of earth coupled heat pump system involves the direct thermal coupling of the primary space conditioning system refrigerant with the earth. In such a system, a looping network of horizontal or vertical connected pipes, which are intact so as not to exchange medium, are buried in the earth or submersed in a retention pond and thereby constitute a closed loop system. During space cooling operation the earth acts as a heat sink wherein heat is removed from the heat pump system and given off to the earth. During space heating operation the earth acts as a heat source wherein heat is extracted from the earth and absorbed into the heat pump system. During either heating or cooling operation primary liquid heat source circulating pumps are energized and circulate the liquid heat source through the closed loop system to effectuate the heat exchange process. Liquid heating devices have been connected to such liquid heat sources for the purpose of providing domestic hot water. However, a problem associated with such prior systems is that for domestic hot water operation the primary liquid heat source circulating pumps were required to operate.

A domestic hot water heat pump apparatus is needed to provide domestic hot water wholly independent of a primary space conditioning system operation. An apparatus is needed that can remove heat from a primary liquid heat source associated with a primary space conditioning system and use it to elevate the temperature of a separate body of liquid. The heat removal must be accomplished regardless of whether the primary system is in an on mode or an off mode.

SUMMARY OF THE INVENTION

The present invention involves coupling a hot water heat pump apparatus to a primary liquid heat source, which is operably connected to a primary space conditioning system. The hot water heat pump apparatus extracts heat from the primary liquid heat source and raises the temperature of a thermally connected body of water, such as liquid stored in a domestic hot water supply tank. The domestic hot water heat pump of the present invention features operation wholly independent of the primary space conditioning system. An example of a type of primary space conditioning system with which the present invention may be coupled is an earth coupled ground loop system.

One feature of the present invention heat pump apparatus is a check valve type coupling device which couples a domestic hot water heat pump to a primary liquid heat source. The heat pump is provided with a dedicated circulating pump which circulates the liquid heat source through a first heat exchanger circuit, thereby allowing the heat pump to, among other things, produce domestic hot water independent of liquid heat source primary flow.

Another feature of the domestic hot water heat pump apparatus relates to the liquid heat source coupling device which is provided with a spring actuated check valve so as to prevent reverse liquid flow through the coupling device which would result in heat exchange short circuiting.

Yet another feature of the present invention is that the invention may be used in retrofit applications without requiring additional capacity in the existing primary liquid heat source system.

With a primary liquid heat source circulating pump in an energized mode, a portion of the liquid heat source is diverted to the domestic hot water heat pump. This is accomplished by means of a coupling device disposed in either the supply or return line of the liquid heat source. The liquid heat source enters the coupling device through a supply port and travels into and through a first heat exchanger, where it is in heat exchange relationship with a refrigerant circuit. A dedicated pump incorporated in the heat pump apparatus or separate therefrom draws the liquid heat source out of the first heat exchanger and propels the liquid through a return port in the coupling device, where it is returned to the primary liquid heat source flow.

With the liquid heat source primary circulating pump in a de-energized mode, a reduced level of liquid heat source flow is achieved by the dedicated secondary pump so as to provide sufficient capacity for hot water heat pump operation. Incorporated in the coupling device is a spring loaded check valve, or comparable device, for preventing short circuiting of the liquid heat source.

The refrigerant in a refrigerant circuit flows through a second heat exchanger where it is in heat exchange relationship with water stored in a hot water retention tank which may be integral with the heat pump apparatus or separate therefrom. The hot water heat pump maintains the water stored in the tank at a pre-determined temperature. A conventional electrical resistance domestic hot water heater may serve as the hot water retention tank. The hot water heat pump may energize the electric resistance heating elements of the domestic hot water heater in the event of faulty heat pump operation or for added hot water heating capacity. In another alternative, the hot water heat pump may be connected to a spa or to a hot tub.

The domestic hot water heat pump as implemented in a typical earth coupled closed loop system is coupled to an earth coupled closed loop liquid heat source. The liquid heat source has a primary function of providing a heat sink/source for space conditioning ground source heat pumps. The liquid heat source is circulated through the system by a primary circulating pump or pumps. Without a dedicated pump, the operation of the hot water heat pump apparatus would require the operation of the closed loop primary circulating pumps. This would require extra controls to engage the primary circulating pump directly from the hot water heat pump and result in unnecessary on-time for the primary pumps which would lead to lower efficiency, higher operating costs and increased maintenance. According to the present invention, the dedicated pump is designed to generate a sufficient level of liquid heat source flow through the earth coupled closed loop system to adequately support hot water heat pump operation.

In one embodiment the invention provides an apparatus for heating liquid which is coupled to a liquid heat source which serves a primary space conditioning system. The liquid heating apparatus includes a heat pump and means for coupling the heat pump to the liquid heat source. The heat pump includes first and second liquid circuits and first and second circulating devices. The first circulating device circulates liquid through the first circuit which is in heat exchange relationship with the second circuit. The second circuit removes heat from the first circuit, and the second circulating device circulates liquid through the second circuit. In this manner, the liquid heating apparatus operates independently.

In another embodiment the present invention provides an earth coupled closed loop system having an earth coupled heat source which is coupled to a domestic hot water heating system. The domestic hot water heating system includes a coupling device, a heat pump, a tank, and first and second pumps. The heat pump includes first, second and third liquid circuits and a compressor. The coupling device couples the first circuit of the heat pump to the earth coupled heat source. The first pump circulates liquid through the first circuit which is in heat exchange relationship with the second circuit so as to define a first heat exchanger. The second circuit is circulated by the heat pump compressor so as to remove heat from the first circuit. The second circuit is in heat exchange relationship with the third circuit thereby defining a second heat exchanger. The second pump circulates water stored in the tank through the third circuit. The third circuit removes heat from the second circuit, thereby raising the temperature of the liquid as it circulates from the tank, through the second heat exchanger and back into the tank.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 1 is a schematic diagram of the liquid heating apparatus of the present invention as shown coupled to a liquid heat source and hot water retention tank;

FIG. 2 is a schematic diagram showing the liquid heating apparatus of FIG. 1 coupled to an earth coupled closed loop system and a hot water retention tank for delivering domestic hot water; and FIG. 3 is a schematic diagram of the check valve type coupling device associated with the liquid heating apparatus of FIG. 1.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DETAILED DESCRIPTION OF THE INVENTION

Referring now to the drawings and particularly to FIG. 1, liquid heating apparatus 20 is shown having check valve type coupling device 22, dedicated liquid heat source pump 24, first heat exchanger 26, refrigerant circuit circulating device 28, second heat exchanger 30, and dedicated hot water circulating pump 31. Liquid heating apparatus 20 is coupled to liquid heat source 32 by check valve type coupling device 22 as shown here connected to the supply side of liquid heat source 32. In an alternative arrangement, coupling device 22 could be connected to the return side of heat source 32. With the primary liquid heat source circulating pumps, such as primary circulating pumps 34 as shown in FIG. 2, in an energized mode, liquid heat source 32 is urged through supply conduit 36 and through coupling device 22.

With reference jointly to FIG. 1 and FIG. 3, as liquid heat source 32 is urged through main passage 38 of coupling device 22, a portion of the heat source is diverted through supply port 40. The liquid heat source exits supply port 40, travels through supply conduit 42, and enters first heat exchanger 26. While traveling through first heat exchanger 26, which in one form may be an evaporator, the liquid heat source is in heat exchange with the refrigerant flowing through refrigerant circuit 44. In this manner the refrigerant in refrigerant circuit 44 removes heat from liquid heat source 32. Pump 24 draws the liquid heat source out of first heat exchanger 26 and propels the liquid through return conduit 46, through return port 48, and back into the liquid heat source supply line where it exits coupling device 22 along conduit 50.

With the liquid heat source circulating pumps in a de-energized mode, a reduced level of flow through liquid heat source 32 is achieved by pump 24 so as to provide sufficient capacity for the operation of liquid heating apparatus 20. Spring loaded check valve 52 is provided in main passage 38 to prevent the short circuiting of liquid through first liquid circuit 54 as defined by conduits 42 and 46 and first heat exchanger 26.

Refrigerant circuit 44 is defined by conduits 56 and 58, heat exchangers 26 and 30, and refrigerant circuit circulating device 28, typically a heat pump compressor. Refrigerant in circuit 44 flows through second heat exchanger 30, which in one form may be a condenser, where it is in heat exchange relationship with second liquid circuit 60. Liquid heating apparatus 20 is thermally coupled with hot water retention tank 62 by second liquid circuit 60. Hot water circulating pump 31 circulates water from tank 62 into and through heat exchanger 30 and back to tank 62. Make-up water is delivered to tank 62 by water supply 64 at inlet 66 and exits tank 62 in the form of hot water supply 68 at outlet 70. Liquid heating apparatus 20 maintains the water stored in tank 62 at a pre-determined temperature by cycling on and off pumps 24 and 31 and circulating device 28. When a conventional electrical resistance domestic hot water heater takes the place of generic tank 62, the electric resistance heating elements 63 may be energized in the event of faulty liquid heating apparatus operation or for added hot water heating capacity.

The embodiment illustrated in FIG. 1 may be altered to demonstrate the most basic implementation of the present invention. Second circuit 44 may be removed along with first heat exchanger 26 and circulating device 24. In this configuration liquid heating apparatus 20 consists of first circuit 54, second circulatory device 28, third circulating device 31, third circuit 60, and second heat exchanger 30. Coupling device 22 may or may not be included in liquid heating apparatus 20. In this reduced embodiment, the liquid in first circuit 54 is circulated by second circulating device 28 through second heat exchanger 30. Third circulating device 31 causes the liquid in third circuit 60 to circulate through second heat exchanger 30. Third circuit 60 is in heat exchange relationship with and removes heat from first circuit 54. In this manner, liquid heating apparatus 20 extracts heat from liquid heat source 32 and thereby raises the temperature of liquid circulating through third circuit 60.

FIG. 2 illustrates liquid heating apparatus 20 as implemented in a typical earth coupled closed loop system. Liquid heating apparatus 20, typically a hot water heat pump, is coupled to earth coupled closed loop system 72 which has a primary function of providing a heat sink/source for space conditioning ground source heat pump 74. Space conditioning ground source or earth coupled heat pump 74 is typically comprised of a plurality of series or parallel connected heat pumps which condition the air in defined spaces, such as offices. The hot water heat pump of the present invention may be connected to any suitable space conditioning system, for example ground source loop, closed loop, open loop, etc. Such space conditioning systems are well known in the art and generally include a plurality of units connected to a liquid heat source which is circulated through a common circuit by primary circulating pumps. The typical individual space conditioning unit includes a compressor, a fan for circulating space air over a combination heating and cooling coil, and a reversible valve for switching the unit between heating and cooling operation. With primary circulating pumps 34 energized, liquid heat source 32 travels through conduit 36 where a portion of the liquid heat source is diverted into first liquid circuit 54 by coupling device 22. This portion of the liquid heat source exits coupling device 22 at supply port 40 and enters first liquid circuit 54. The liquid heat source then travels through first heat exchanger 26, which in one form may be an evaporator, thereby placing it in heat exchange with the refrigerant circulated through refrigerant circuit 44. Pump 24 draws the liquid heat source out of heat exchanger 26 and returns it to the closed loop system at conduit 50 through return port 48 of coupling device 22.

With the liquid heat source circulating pumps 34 in a de-energized mode, a reduced level of flow through liquid heat source 32 is achieved by pump 24 so as to provide sufficient capacity for the operation of liquid heating apparatus 20. Spring loaded check valve 52 is incorporated in coupling device, 22 to prevent short circuiting of first liquid circuit 54.

As described hereinbefore, refrigerant circuit 44 is propelled through conduits 56 and 58 by refrigerant circuit circulating device 28, typically a heat pump compressor. The refrigerant in circuit 44 flows through second heat exchanger 30, which in one form may be a condenser, where it is in heat exchange relationship with second liquid circuit 60. Liquid heating apparatus 20 is coupled with hot water retention tank 62 by second liquid circuit 60. Hot water circulating pump 31 circulates the liquid stored in tank 62 through second liquid circuit 60 and second heat exchanger 30. Water is delivered to tank 62 by water supply 64 at inlet 66 and exits tank 62 in the form of hot water supply 68 at outlet 70. Liquid heating apparatus 20 maintains the water stored in tank 62 at a predetermined temperature by cycling on and off pumps 24 and 31 and circulating device 28, thereby circulating liquid through circuits 44 and 54 and tank water through second liquid circuit 60.

In one embodiment, tank 62 is a conventional electrical resistance domestic hot water heater, the electric resistance heating elements may be energized in the event of faulty liquid heating apparatus operation or for added hot water heating capacity. Control apparatus 61 is adapted to control the operation of heating apparatus 20 as described above as well as hot water heating elements 63 in tank 62. Thermostat 65 may be placed on or in tank 62 or on the line of second circuit 60 and may send a variable or a two position sensing signal to control apparatus 61.

Without liquid heat source pump 24, the operation of liquid heating apparatus 20 would require the operation of primary circulating pumps 34. Thus resulting in unnecessary on-time for primary circulating pumps 34, lower efficiency, higher operating costs and increased maintenance. According to the present invention, pump 24 is designed to circulate sufficient heat source flow through the earth coupled closed loop system to adequately support hot water liquid heating apparatus operation. As described before, hot water retention tank 62 may be a simple storage tank or it may be a conventional electric resistance domestic hot water heater. The preselected operating temperature of the water stored in tank 62 is typically adjustable up to 135° F. and is maintained by a thermostat mounted thereto. As an alternative, liquid heating apparatus 20 may be connected to a spa or to a hot tub. In such an arrangement, an aquastat may be utilized to cycle liquid heating apparatus 20 in much the same manner as a thermostat disposed within a conventional domestic hot water tank.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A heat exchange apparatus comprising:

a liquid heat source;

first means for circulating said liquid heat source through a liquid heat source loop;

a primary space conditioning system operatively connected to said heat source loop;

a heat exchange loop comprising a first circuit coupled in heat exchange relation with said liquid heat source loop, and a second circuit coupled in heat exchange relation with a body of liquid to be heated, said first circuit in heat exchange relationship with said second circuit, whereby heat from said liquid heat source is transferred to said body of liquid;

coupling means for selectively coupling said heat exchange loop with said liquid heat source loop and for diverting a portion of said liquid heat source through said heat exchange loop; and second means for circulating said liquid heat source through said liquid heat source loop, and said heat exchange loop independently of the said first circulating means, whereby said heat exchange apparatus operates independently of the primary space conditioning system.

2. The heat exchange apparatus of claim 1 further comprising a liquid holding tank which contains said body of liquid.

3. The heat exchange apparatus of claim 2, wherein said liquid holding tank provides hot water supply.

4. The heat exchange apparatus of claim 2, wherein said liquid holding tank comprises a water tank and heater for heating water contained in said water tank, said water tank coupled to said second circuit.

5. The heat exchange apparatus of claim 1, wherein said selecting means comprises a check valve assembly connected in line with said liquid heat source, said valve assembly having a supply and return means for coupling said heat exchange apparatus with said liquid heat source so that a portion of said liquid heat source flows through said first circuit.

6. The heat exchange apparatus of claim 5, wherein said valve assembly includes a spring loaded check valve to prevent reverse direction liquid heat source flow and to prevent short circuiting of said first circuit.

7. The heat exchange apparatus of claim 1, wherein said liquid heat source is an earth coupled closed loop.

8. The heat exchange apparatus of claim 1 further comprising means for controlling said heat exchange loop and said selecting means to maintain said body of liquid at a preselected temperature.

9. The heat exchange apparatus of claim 8 further comprising a liquid holding tank containing said body of liquid and a heater for heating said body of liquid, said controlling means adapted to control the operation of said heater.

10. A heat exchange apparatus for use with a primary space conditioning system comprising;
a liquid heat source;
a liquid heat source loop;
first means for circulating said liquid heat source through a liquid heat source loop and a said primary space conditioning system;
a heat exchange, loop comprising a first circuit coupled in heat exchange relation with the liquid heat source loop and a second circuit coupled in heat exchange relation with a body of liquid to be heated, said first circuit in heat exchange relationship with said second circuit whereby heat from the liquid heat source is transferred to said body of liquid;
coupling means for selectively coupling said heat exchange loop with said liquid heat source loop and for diverting a portion of said liquid heat source through said heat exchange loop; and
second means for circulating the liquid heat source through said liquid heat source loop and said first liquid circuit independently of the first circulating means, whereby said heat exchange apparatus operates independently of the primary space conditioning system.

11. The heat exchange apparatus of claim 10 further comprising a liquid holding tank containing said body of liquid.

12. The heat exchange apparatus of claim 11, wherein said liquid holding tank comprises a water tank and heater for heating said body of liquid, said water tank coupled to said second circuit, said selecting means adapted to control the operation of said heater.

13. The heat exchange apparatus of claim 10, wherein said selecting means comprises a check valve assembly connected in line with the liquid heat source, said valve assembly having a supply and return means for coupling said heat exchange apparatus with the liquid heat source so that a portion of the liquid heat source flows through said first circuit.

14. The heat exchange apparatus of claim 13, wherein said valve assembly includes a spring loaded check valve to prevent reverse direction liquid heat source flow and to prevent short circuiting of said first circuit.

15. The heat exchange apparatus of claim 10, wherein the liquid heat source is an earth coupled closed loop.

16. A space conditioning system including a liquid heat source comprising:

a first heat exchange loop connected to a said liquid heat source;
first means for circulating a said liquid heat source through said first heat exchange loop;
a first heat exchanger adapted to transfer heat from the said liquid heat source to a space being conditioned, said first heat exchanger coupled with said first heat exchange loop, said first circulating means circulating the said liquid heat source through said first heat exchanger;
a second heat exchange loop coupled intermediate said first heat exchange loop and a body of liquid to be heated;
second means for circulating said liquid heat source through said first heat exchange loop and said second heat exchange loop;
a second heat exchanger coupled with said second heat exchange loop and transferring heat from said liquid heat source to said body of liquid, said second circulating means circulating the said liquid heat source through said second heat exchanger;
coupling means for selectively coupling said second heat exchange loop with said liquid heat source loop and for diverting a portion of said liquid heat source through said heat exchange loop independently of said first heat exchange loop, whereby the said liquid heat source may flow through said second heat exchange loop independently of said first circulating means.

17. The space conditioning system of claim 16 further comprising a liquid holding tank containing said body of liquid and coupled to said second heat exchanger, said second heat exchanger transferring heat from said liquid heat source to said body of liquid.

18. The space conditioning system of claim 17, wherein said liquid holding tank comprises a water tank and heater for heating said body of liquid, and said water tank is connected to a water supply and is coupled to said second heat exchanger.

19. The space conditioning system of claim 18, wherein said second heat exchanger comprises a heat pump having control means and a refrigerant compressor, said control means is adapted to control the operation of the heater, and said hot water tank provides a hot water supply.

20. The space conditioning system of claim 19, wherein said selecting means comprises a check valve assembly connected in line with said first heat exchange loop and couples said liquid heat source with said second heat exchange loop, said valve assembly includes a supply means and return means for coupling said second heat exchanger with said liquid heat source, whereby said second circulating means enables a portion of said liquid heat source to flow through said second heat exchange loop and said second heat exchanger.

21. The space conditioning system of claim 20, wherein said valve assembly includes a spring loaded check valve to prevent reverse direction liquid heat source flow and to prevent short circuiting of said second heat exchange loop.

22. The space conditioning system of claim 15, wherein said liquid heat source is an earth coupled closed loop.

23. A heat exchange apparatus comprising:
a space conditioning system having a liquid heat source and a first means for circulating said liquid heat source through a liquid heat source loop;
a heat exchange loop coupled in heat exchange relation intermediate said liquid heat source loop and a body of liquid to be heated;

coupling means for selectively coupling said heat exchange loop with said liquid heat source loop and for diverting a portion of said liquid heat source through said heat exchange loop; and second means for circulating said liquid heat source through said liquid heat source loop and said heat exchange loop independently of said first circulating means.

24. The heat exchange apparatus of claim 23 further comprising a liquid holding tank containing said body of liquid.

25. The heat exchange apparatus of claim 24 further comprising heat exchange means coupled between said heat exchange loop and said body of liquid, and third means for circulating liquid from said holding tank through said heat exchange means.

26. The heat exchange apparatus of claim 24, wherein said liquid holding tank comprises a water tank and heater for heating water contained in said water tank.

27. The heat exchange apparatus of claim 24, wherein said liquid holding tank comprises a hot water heater comprising a hot water tank and heater for heating water contained in said hot water tank, said hot water tank is coupled intermediate a water supply and said heat exchange loop, and said hot water tank provides hot water supply.

28. The heat exchange apparatus of claim 23 further comprising means for controlling said heat exchange loop and said selecting means to maintain said body of liquid at a preselected temperature.

29. The heat exchange apparatus of claim 28 further comprising a liquid holding tank containing said body of liquid and a heater for heating liquid contained in said liquid holding tank, said controlling means adapted to control the operation of said heater.

30. The heat exchange apparatus of claim 23, wherein said selecting means comprises a check valve assembly connected in line with said liquid heat source, said valve assembly includes a supply and return means for coupling said heat exchange loop with said liquid heat source so that a portion of said liquid heat source flows through said heat exchange loop.

31. The heat exchange apparatus of claim 30, wherein said valve assembly includes a spring loaded check valve to prevent reverse direction liquid heat source flow and to prevent short circuiting of said heat exchange loop.

32. The heat exchange apparatus of claim 23, wherein the liquid heat source is an earth coupled closed loop.

* * * * *